United States Patent [19]
Ueda et al.

[11] 3,901,991
[45] Aug. 26, 1975

[54] NON-COMBUSTIBLE SHAPED ARTICLES AND PROCESS FOR THE PREPARATION THEREOF

[75] Inventors: Harutoshi Ueda, Osaka; Naoyuki Suzuki, Nara; Masami Nagao, Takatsuki; Satoshi Shiroza, Ibaraki; Hiroshi Hayashi, Kyoto, all of Japan

[73] Assignee: Sekisui Kagaku Kogyo Kabushiki Kaisha, Osaka, Japan

[22] Filed: Dec. 28, 1971

[21] Appl. No.: 213,224

[30] Foreign Application Priority Data
Dec. 29, 1970 Japan............................. 46-124124

[52] U.S. Cl. ................. 428/446; 106/84; 106/120; 264/333; 428/451; 428/500; 428/538
[51] Int. Cl............................................. B32b 13/00
[58] Field of Search..................... 161/151, 162, 206; 264/333; 117/123 A, 169, 70 D; 106/84, 120, 99, 109

[56] References Cited
UNITED STATES PATENTS

| | | | |
|---|---|---|---|
| 2,549,516 | 4/1951 | Parry | 117/20 S |
| 2,698,251 | 12/1954 | Shea et al. | 106/120 |
| 2,946,158 | 7/1960 | Scipt | 117/123 A |
| 2,946,695 | 7/1960 | Dietz et al. | 106/84 |
| 3,285,757 | 11/1966 | Cornely | 106/84 X |
| 3,488,209 | 1/1970 | Ayers et al. | 117/123 A |
| 3,501,323 | 3/1970 | Moorehead | 106/120 X |

*Primary Examiner*—George F. Lesmes
*Assistant Examiner*—Stanley S. Silverman
*Attorney, Agent, or Firm*—Wenderoth, Lind & Ponack

[57] ABSTRACT

A non-combustible shaped article which is composed of the base material shaped of a mixture comprising a hydraulic inorganic composition consisting of a water-insoluble inorganic substance composed predominantly of silica and another inorganic substance composed predominantly of calcium oxide, and mineral fibers, under addition of water, and a surface material integrally bound on at least one surface of said base material, which is applied to said surface as an aqueous dispersion of a hydraulic inorganic composition consisting of a water-insoluble inorganic substance composed predominantly of silica and another inorganic substance composed predominantly of calcium oxide, or of the mixture of said hydraulic inorganic composition with at least one member of the group consisting of water-soluble silicate compound, zirconium compound and alkali metal hydroxide, and then hardened under heating as an integral structure, and a process for the preparation thereof.

17 Claims, No Drawings

NON-COMBUSTIBLE SHAPED ARTICLES AND PROCESS FOR THE PREPARATION THEREOF

This invention relates to non-combustible articles. More particularly, the invention relates to non-combustible shaped articles formed of integrally bound base material and surface decorative material of high strength and excellent waterproof property, said base material being made of a hydraulic composition consisting of waterinsoluble inorganic substance chiefly of silica and another inorganic substance chiefly of calcium oxide, and mineral fibers.

Non-combustible shaped articles formed by addition of mineral fibers to cement, gypsum, etc. to improve the latter's physical strength as well as non-combustible property are known. Conventionally the surface finish of such non-combustible shaped articles has been performed by physically adhering to the surfaces of such articles, decorative sheets or laminates, using adhesives. However, the operations for such practice are complex, and the products are subject to such deficiencies as that the adhered surface sheets tend to peel off, also their surface hardness is reduced when the surface sheets contain organic materials.

Furthermore, combustible polymers, etc. are frequently employed as the materials of conventional decorative sheets, and therefore when heated, gasifiable components in the decorative sheets tend to discharge toxic gas or smoke. Thus the articles are quite inappropriate as construction materials.

The object of the present invention is to provide non-combustible shaped articles in which the base and surface decorative materials are integrally bound by chemical reaction so that the surface layer never peels off from the base, and which exhibit high surface hardness, excellent waterproof property and heat resistance.

Another object of the invention is to provide a process for the preparation of such non-combustible shaped articles.

Still other objects and advantages of the invention will become apparent from the following specification and appended claims.

According to the invention, non-combustible shaped articles prepared by applying onto at least one surface of the base material which has been shaped of a mixture comprising a hydraulic inorganic composition consisting of water-insoluble inorganic substance predominantly of silica and another inorganic substance predominantly of calcium oxide; mineral fibers; and water; as the surface material an aqueous dispersion comprising a hydraulic inorganic composition consisting of a water-insoluble inorganic substance predominantly of silica and another inorganic substance predominantly of calcium oxide, or an aqueous dispersion comprising a mixture of such hydraulic inorganic composition with at least one member of the group consisting of water-soluble silicate compound, zirconium compound, and alkali metal hydroxide; and hardening the base and surface materials, are provided.

The hydraulic inorganic composition employed in the non-combustible shaped articles of the invention is a mixture of water-insoluble inorganic substance composed predominantly of silica and another inorganic sibstance composed predominantly of calcium oxide. The composition is not hardenable simply by addition of water, that is, not hardenable at room temperature. The composition undergoes the hydration reaction only when it is added with water, and heated to at lowest 50°C. under the steam pressure, preferably to 80° to 200°C. under the steam pressure, and is hardened. In this point the composition is clearly distinguishable from conventional hydraulic inorganic materials such as cement, gypsum, mortar, concrete, etc., which are hardenable at normal temperature and pressure.

The "water-insoluble inorganic substance composed predominantly of silica" refers to the inorganic substance containing $SiO_2$ in free state (i.e., $SiO_2$ is not bound with other atoms or atomic groups as in sodium silicate, $Na_2O \cdot SiO_2$) and allowably other minor quantities of impurities, such as alumina, $Fe_2O_3$, $NaO$, etc., specific examples of which including silex, siliceous sand, aplite, pottery stone, silicate terra able, paigeite, diatomaceous earth, fly ash, and perlite.

Also the "inorganic substance composed predominantly of calcium oxide" refers to the inorganic matter which can provide calcium oxide to cause the formation of a crystal system, $SiO_2 \cdot CaO \cdot H_2O$, upon hydration reaction with the silica in the above water-insoluble inorganic substance, specific examples of which including cement, slaked lime, quick lime, calcium carbonate and gypsum.

The water-insoluble inorganic substance composed predominantly of silica and the inorganic substance composed predominantly of calcium oxide are present in the hydraulic inorganic composition preferably in finely divided form, so as to improve the homogeneity of the composition. The preferred particle size is not greater than 325 mesh (Tyler), particularly approximately 5 microns.

Suitable blend ratio of the two organic substances in the hydraulic composition for the base material is such that the molar ratio of the calcium oxide contained in the second inorganic substance to the silica in the water-insoluble, inorganic substance should range from 0.5 to 2.0, preferably 0.6 to 1.2. Also for the surface material, the suitable blend ratio is such that the similar molar ratio should range from 0.8 to 4.0, preferably 1.2 to 3.0. Furthermore, the optimum results can be obtained when the molar ratio is higher in the surface material than that in the base material.

However, when the molar ratio of calcium oxide to silica is made greater than 4.0, the amount of calcium oxide remaining unreacted becomes conspicuous, and consequently the resulting non-combustible shaped articles are apt to form calcium hydroxide as reacted with water, reducing the hardness of the surface material. Therefore, such high molar ratios should be avoided.

The mineral fibers to be employed concurrently with the hydraulic composition for the base material are the inorganic fibrous materials exhibiting no hydraulic property themselves, such as, for, example, chrysotile asbestos ($3MgO \cdot SiO_2 \cdot 2H_2O$), amosite asbestos [$(FeMg)_6Si_8O_{22}(OH)_2$], crocidolite asbestos [$Na_2Fe_6Si_8O_{22}(OH)_2$], amphibole asbestos [$Ca_2Mg_5Si_8O_{22}(OH)_2$], tremolite asbestos [$Ca_2Mg_5Si_8O_{22}(OH)_2$], actinolite asbestos [$Ca(MgFe)_3(SiO_2)_4H_2O$], rock wool, glass fibers, and slag wool. The mineral fibers particularly play a role of reinforcing the non-combustible shaped articles. Preferably, therefore, the mineral fibers have a length of 3 to 30 mm, particularly 5 to 15 mm. Mineral fibers shorter than 3 mm do not serve for the reinforcing purposes expected of their fibrous form. If the mineral fibers are longer than 30 mm, they tend to get entangled with each other and become difficult to uniformly disperse in the hydraulic composition.

In the base material, suitable amount of the mineral fibers to be added to the hydraulic composition ranges from 10 to 200 parts, particularly 20 to 100 parts, per 100 parts of the hydraulic composition, the parts being by weight.

The base material may contain, in addition to the mineral fibers, organic fibers to improve the reinforcing effect by the fibrous materials. Examples of organic fibers useful for this purpose include: polypropylene fibers, polyethylene fibers, polyvinyl alcohol fibers, polyamide fibers, acrylic fibers, polydinitrile fibers, polyester fibers, polyvinyl chloride fibers, polyvinylidene chloride fibers, polynosic fibers, acetate fibers, urea fibers, artificial silk, rayon staple fibers, cotton, silk, flax, and animal fibers.

The amount of such organic fibers, however, should not exceed 20 parts per 100 parts of the hydraulic composition for base material, particularly suitable range being 1 to 10 parts, the parts being by weight. When it exceeds 20 parts, the non-combustible property of the shaped articles deteriorates due to the combustibility of organic fibers.

One of the unique features of the shaped articles of this invention resides in that the base comprising a hydraulic composition and mineral fibers, and optionally, organic fibers, is chemically bound with surface material to provide an integral structure.

The surface material according to the invention is formed of a hydraulic composition consisting of a water-insoluble, inorganic substance composed predominantly of silica and another inorganic substance composed predominantly of calcium oxide; or of the mixture of such hydraulic composition with at least one member of the group consisting of water-soluble silicate compound, zirconium compound, and alkali metal hydroxide.

The hydraulic inorganic composition for the surface material may be similar to that for the base material. As already mentioned, the molar ratio of calcium oxide in the second inorganic substance to the silica in the water-insoluble inorganic substance should preferably be higher in the hydraulic composition for surface material.

The surface material in accordance with the invention may be formed of the hydraulic composition alone, or of the mixture of the hydraulic composition with at least one member of the group consisting of water-soluble silicate compound, zirconium compound, and alkali metal hydroxide.

The silicate compound is distinguishable from the inorganic substance composed predominantly of silica in that the former is water-soluble. As the useful water-soluble silicate compound, for example, the following may be named: sodium ortho-silicate, sodium sesquisilicate, sodium disilicate, potassium meta-silicate, potassium disilicate, and potassium tetrasilicate. Water glass can be used as one of such silicate compounds.

Also useful zirconium compounds are those which can provide zirconium oxide (ZrO) under the hardening conditions, such as zirconium oxide, zirconium silicate, zirconium carbonate, and zirconium hydroxide, zirconium oxide being particularly preferred.

As the alkali metal hydroxide, potassium hydroxide, sodium hydroxide, lithium hydroxide, and the like can be used, sodium hydroxide being particularly preferred. Because these alkali metal hydroxides possess the ability to accelerate the hardening speed of the hydraulic inorganic composition, they may be contained also in the base material, for promoting its hardening.

In the surface material, the silicate compound, zirconium compound, and alkali metal hydroxide may be used singly, or more than one of them may be concurrently used. The suitable amount to be added is not more than 20 parts, particularly 0.1 to 15 parts, per 100 parts of the hydraulic composition for the surface material, the parts being by weight. If they are added in an amount exceeding 20 parts, satisfactory integration of the surface material and base becomes difficult to achieve during their hardening.

According to another embodiment provided by this invention, the surface material may contain, besides the hydraulic inorganic composition, water-soluble silicate compound, zirconium compound and/or alkali metal hydroxide; a resinous additive, to smooth the surfaces of the shaped articles and further reduce the water-absorbing property and hygroscopicity of the surface material.

The "resinous additive" usable in the surface material according to the invention is a synthetic resin of a molecular weight ranging from 50,000 to 500,000, including non-elastic, thermoplastic synthetic resins, thermoplastic rubbery high molecular weight compounds and thermosetting synthetic resins.

The non-elastic, thermoplastic synthetic resin, thermoplastic, rubbery high molecular weight compound, and thermosetting synthetic resin, can be used singly, or as mixture of more than one of such substances.

Examples of the non-elastic thermoplastic synthetic resins include olefin resins such as polyethylene resin, polypropylene resin, copolymers of ethylene and other monomers copolymerizable therewith; styrene resins such as polystyrene resin, and copolymers of styrene with other monomers copolymerizable therewith; vinyl resins such as vinyl chloride resin and vinyl acetate resin; polyamide resins; polyacrylonitrile resin; polyacrylate resin; saturated polyester resins; cellulose acetate resins; and polyethylene oxide.

Examples of the thermoplastic rubbery high molecular weight compound that can be used in the invention include natural rubber, polyisoprene rubber, polybutadiene rubber, polypropylene oxide, polychloroprene rubber, polyisobutylene, rubbery isobutylene/isoprene copolymer, rubbery ethylene/propylene copolymer, rubbery styrene/butadiene copolymer, rubbery chlorosulfonated polyethylene, acrylic rubber, rubbery ethylene/vinyl acetate copolymer.

As the thermosetting resin, there can be used unsaturated polyester resins, epoxy resins, urea resins, melamine resins, and phenolic resins.

Such resinous additive can be contained in the hydraulic inorganic composition for the surface material, in an amount ranging 1 to 10 parts, preferably 2 to 5 parts, per 100 parts of the hydraulic composition, the parts being by weight.

When the amount of resinous additive is less than one part by weight, the surface unevenness of the shaped articles cannot be completely mended upon applying the surface material onto the base and hardening the same, and although the surface hardness can be somewhat improved, hygroscopicity and water-absorbing property cannot be appreciably reduced. On the other hand, if it is greater than 10 parts by weight, the articles' water-absorbing property and hygroscopicity are reduced, but the surface hardness is objectionably reduced. Also because the organic resin component in the surface material is so increased, the articles' non-combustible property is lessened.

According to still another embodiment provided by the invention, the surface material may contain inorganic pigments which are conventionally used with construction material. As such inorganic pigments, red iron oxide, chrome yellow, prussian blue, ultramarine, iron black, molybdenum red, zinc chromate, etc. may be named. They may be used singly or as mixtures, in an amount not more than 20 parts, preferably from 3 to 10 parts, per 100 parts of the hydraulic composition for surface material, the parts being by weight.

It is also permissible, according to the invention, to form an organic or inorganic paint layer on the surfaces of shaped articles, instead of adding such inorganic paint to the surface material. As the organic paints useful for this purpose, for example, acrylic paint, styrene/acrylonitrile paint, vinyl acetate paint, etc. may be named, and as the inorganic paint, water glass type paint can be conveniently used.

According to this invention, there is also provided a process for the preparation of non-combustible shaped articles, which comprises the steps of:

1. adding to a hydraulic inorganic composition consisting of a water-insoluble inorganic substance composed predominantly of silica and another inorganic substance composed predominantly of calcium oxide; mineral fibers and water, and optionally, organic fibers, and thoroughly mixing the components, 2. shaping the mixture, 3. separately preparing an aqueous dispersion by dispersing in water, a hydraulic composition consisting of a water-insoluble inorganic substance composed predominantly of silica, and another inorganic substance composed predominantly of calcium oxide, or a mixture of such hydraulic composition with at least a member of the group consisting of water-soluble silicate compound, zirconium compound and alkali metal hydroxide, and optionally, resinous additive and/or inorganic pigment, 4. applying said aqueous dispersion onto at least one surface of the shaped base as obtained in the step (2), 5. removing water content of the base coated with the aqueous dispersion under a pressure ranging from 50 to 500 kg/cm², 6. converting the above structure to semi-hardened shaped article by the primary aging at 60° – 90°C. and atmospheric pressure, for 5 to 10 hours, and 7. subjecting the semi-hardened shaped article to the secondary aging at 150° – 210°C. under a steam pressure ranging from 5 to 20 atmospheres, for 5 – 20 hours.

In the preparation of non-combustible shaped articles according to the invention, first mineral fibers, and optionally organic fibers, are added to the powdery hydraulic inorganic composition, and the mixture is thrown into a mixer, together with water, to be thoroughly mixed. The suitable amount of water in this case should be at least sufficient to complete the hydration reaction of the silica with calcium oxide in the hydraulic composition, i.e., 5 – 80 parts by weight per 100 parts by weight of the hydraulic composition. However, for the maximum possible intimate mixing of the hydraulic inorganic composition with the fibrous component, preferably the water is used in large excess to allow thorough dispersing of the components therein, and thereafter the dispersion is filtered by suitable means to remove surplus water. Thus formed composition of the viscosity suitable for shaping is shaped with a suitable apparatus such as an extruder, or passed through a web-forming machine, and shaped into optional forms such as rod, sheet, plate, pipe, corrugated sheet, etc.

Thus shaped base material may be semi-hardened under heating at 50° – 100°C., but it is more advantageous to apply the surface material onto said base material as it is, and thereafter harden the whole structure under heating.

The aqueous dispersion to be applied onto the base material as the surface material can be prepared by dispersing in water the afore-described hydraulic inorganic composition alone, or a mixture of such hydraulic composition with at least one member of the group consisting of water-soluble silicate compound, zirconium compound and alkali metal hydroxide, and furthermore, optionally, resinous additive and/or inorganic pigment, and thoroughly stirring and mixing the system to impart thereto the viscosity suitable for the application onto the base surface or surfaces, preferably 5 – 50 poises, inter alia, 10 – 30 poises.

For the preparation of such aqueous dispersion with the specified viscosity, if the hydraulic inorganic composition alone is to be used, 10 – 200 parts, preferably 80 – 150 parts, of the composition is used per 100 parts of water. Also when a mixture of the hydraulic composition with water-soluble silicate compound, zirconium compound, and/or alkali metal hydroxide is used, 10 – 70 parts, preferably 20 – 50 parts, of the mixture is dispersed in 100 parts of water. If resinous additive and inorganic pigment are to be added, the total of the resinous additive or additives should range 0.1 – 20 parts, preferably 1 – 15 parts, and the inorganic pigment, 0.1 – 40 parts, preferably 0.2 – 10 parts, each per 100 parts of water, the parts being by weight.

Furthermore, alumina or the like may be advantageously added, as the hardening accelerator, to the hydraulic inorganic composition, to promote the hydration of base and surface materials and accelerate their hardening. The suitable amount of addition for this purpose is not more than 5 parts by weight per 100 parts by weight of the hydraulic inorganic composition.

Thus obtained aqueous dispersion is applied onto at least one surface of the base material shaped as already described by any of the conventionally employed means, such as spray coating, brush coating etc. The thickness of the surface layer to be applied should be sufficient to supplement the depressions on said surface to make it even, i.e., 0.1 – 5.0 mm, preferably 0.2 – 3.0 mm. When still further improved surface smoothness and luster are desired, the coated surface may be contacted with a sheet of smooth surface such as one of stainless steel, iron or plastic, and pressed as it is under a pressure of 50 – 500 kg/cm², to remove the water content.

The shaped structure formed of the combination of base material and surface material is then heated to be hardened. The hardening can be effected by a single stage heating at 50° – 200°C., under a pressure of 1 – 20 atmospheres. More advantageously, however, the hardening is performed by a two-stage process as follows:

To wit, the structure is first aged under atmospheric pressure in steam of 60° – 90°C., preferably 80°C., for 5 to 10 hours. By this primary aging the structure is converted to a semi-hardened shaped structure which then is placed in a frame and subjected to the secondary aging at 150° – 210°C., preferably 180°C., under a steam pressure of 5 to 20 atmospheres, preferably 18 atmospheres, for 5 to 20 hours, preferably in a high temperature and high pressure reactor (autoclave). Whereupon the structure is completely hardened.

When the thus obtained shaped article is to be further coated with a paint layer, suitable organic or inorganic paint or paints are applied onto the surface of the surface material, and dried.

Thus obtained non-combustible shaped articles according to the process of this invention never have peeling of the surface material from the base, because the water-insoluble, inorganic substance composed predominantly of silica and the inorganic substance composed predominantly of calcium oxide, in the base material, and the similar inorganic substances, as well as the optionally present watersoluble silicate compound, zirconium compound, and/or alkali metal hydroxide, in the surface material, chemically react at the interface of the base and surface materials to form a crystal system and are strongly integrated. The articles also have smooth, decorative surfaces of an extremely high degree of hardness.

The non-combustible shaped articles furthermore exhibit excellent waterproof properties and thus differ from conventionally employed construction materials such as mortar, concrete, and gypsum board, because of the coating of specified surface material, and can sufficiently withstand high temperatures and heating.

Upon observation of the non-combustible shaped articles provided by this invention by means of X-ray diffraction and differential thermal analysis, it is confirmed that the base and surfaces materials have reacted, forming a tobermolite type crystal system and thereby strongly integrating said materials. The absence of the peelingoff phenomenon of the surface material from the base in the articles of this invention is presumably due to the above-confirmed feature. Also the hydraulic, inorganic composition constituting the surface material becomes tobermolite $[Ca_5(Si_6O_{18}H_2)_4 \cdot H_2O]$ type crystal system, a part of which is converted to wollastonite or xonotlite to provide a structure withstanding heat as high as 600° – 1,000°C. Particularly when the molar ratio of calcium oxide to silica in the hydraulic inorganic composition forming the surface material ranges from 0.8 to 4,0, crystals of $\gamma$-$C_2S$ hydrate $[Ca_6(Si_2O_7)(SiO_2)(OH)_2]$ and Hillebrandite $[Ca(SiO_3)(OH)_2]$ are formed, and the articles are confirmed to have extremely high surface hardness and excellent heat resistance.

It is also confirmed that, when crystals as identified above are formed in the surface material, such calcium silicate compounds as crystalline tobermolite $[Ca_5(Si_6O_{18}H_2)_4 \cdot H_2O]$, and tobermolite undergoing crystallization $[Ca_{5-6}(Si_6O_{18}H_2)_n \cdot H_2O]$ are formed in the base material.

Furthermore, when the water-soluble silicate compound, zirconium compound, and/or alkali metal hydroxide is used concurrently in the surface material, the hydraulic inorganic composition in said material reacts with such compound or compounds, to form fine cyrstals of the compound of the composition $MmO \cdot SiO_2$—$CaO \cdot H_2O$ (M being an alkali metal when $m$ is 2, or zirconium when $m$ equals 1). Concurrent presence of such crystals with the already described crystal systems in the surface material notably improves the abrasion resistance of the article, and also markedly reduces the water-absorbing property and hygroscopicity of the surface material. Likewise, the presence of specified resinous additive in the surface material is confirmed to serve to appreciably reduce the water-absorbing property and hygroscopicity of the non-combustible, shaped articles of this invention.

According to the process of this invention, the shaped articles are formed simply by applying the surface material onto the base and heat-hardening them into an integral structure. Thus the preparation procedures are very much shortened compared with the conventional practice of adhering the surface sheet to the base. Also because both the base and surface materials invariably contain the hydraulic inorganic composition consisting of the water-insoluble, inorganic substance composed predominantly of silica and another inorganic substance composed predominantly of calcium oxide, no surface cracking or peeling-off caused by the difference in thermal shrinkage of the materials takes place.

The non-combustible shaped articles obtained according to this invention can be given various shapes such as of flat sheet, curved plate, etc., and can be very conveniently used for wall, floor, ceiling, etc. and other various utilities where non-combustibility is required.

Hereinafter the invention will be explained with reference to working examples, in which parts are by weight, unless otherwise specified.

The non-combustible shaped articles obtained in the following Examples were measured as to their physical properties by the tests specified below:

1. Surface hardness test:
JIS B-7724 (measured with Brinnel's hardness tester)
2. Pencil hardness test:
JIS K-5401 (measured with a pencil scratch tester for coated film)
3. Weather-proof property test:
The condition of each sample after 1,000 hours' exposure to open field in a weather-ometer ("Violet Carbon Arc Weather Meter, Model WE-2, " open type, product of Toyo Rika Kogyo K.K.) was observed with naked eye. The sample showing no surface hardness change, discoloration, efflorescence, and color irregularity was evaluated the highest.
4. Friction-pull test:
The square sample of 1 cm × 1 cm was divided into 100 equal square parts as incised with a knife, and onto which an adhesive tape was intimately adhered. Then the tape was abruptly peeled off, and the amount of the surface material of the sample peeled off together with the tape was determined. When no square came off with the tape, the peeling was zero percent, and when all 100 squares came off, 100%.
5. Non-combustibility test:
The sample having a size of 22 cm × 22 cm was burned for 3 minutes with a city gas burner in which air was fed at a rate of 1.5 liters/min. Thereafter, it was additionally burned with an electric heater with nichrome wire having a capacity of 1.5 KW/hr. for 17 minutes. The fuming, flaming and after-flaming were observed, and the non-combustibility was determined from an overall consideration of the results of the observation.
When no fuming, flaming, generation of toxic gas, and surface cracking occurred during the test, the sample was graded excellent.
6. Boiling test:
The sample of 50 mm × 50 mm in size was boiled in boiling water for 4 hours, and dried in an dryer of 205°C. for 10 hours. Thus the sample was tested as to its its performance; its surface hardness, efflorescence, and surface conditions were examined.

7. Abrasion resistance test:

JIS K-6902-1963. The sample of 100 mm × 100 mm in size was abraded with the grinding paper (AA-180) applied on the surface of abrading wheel H-18 (that normally employed for abrasion of hard materials) mounted on a Taber abrasion tester, under a load of 500 g, at the rotation rate of the turn table 70 r.p.m., at 20° ± 1°C. and 65 ± 5% R.H. The abrasion was repeated 100 times in each test run, and the average abrasion value was calculated.

8. Alkali-resistance test:

Onto the sample surface 0.5 cc of 5% aqueous NaOH was dropped, and 5 hours thereafter the sample's surface conditions were examined. The sample showing no discoloration and elution received high evaluation.

9. Heat stability test:

The sample was heated for 30 minutes each at the varied temperatures as 200°C., 400°C., 500°C., and 600°C., in an electric oven of 250 × 250 × 500 mm in size. After each heating the flexural strength of the sample was measured. The sample which showed no flexural strength deterioration received high evaluation.

EXAMPLE 1

Base material

| | |
|---|---|
| Silex (chemical composition: $SiO_2$ 99.4%, $Al_2O_3$ 0.44%, $Fe_2O_3$ 0.04%, ignition loss: 0.22%) | 100 Parts |
| Slaked lime (purity: 98%) ($CaO/SiO_2$ mol ratio = 0.8) | 100 Parts |
| $Al_2O_3$ (hardening accelerator) | 0.4 Parts |
| Asbestos fiber (5 mm in length) | 110 Parts |

The above non-combustible, molding composition was thoroughly kneaded with 8,680 parts of water in a mixer, and thereafter either passed through the filtering machine to be freed of excessive water, or shaped into a sheet with a wet machine, and then used as the base material.

Surface material

| | |
|---|---|
| Silex (chemical composition: $SiO_2$ 99.4%, $Al_2O_3$ 0.44%, $Fe_2O_3$ 0.04% ignition loss: 0.22%) | 100 Parts |
| Slaked lime (purity: 98%) ($CaO/SiO_2$ mol ratio = 1.6) | 200 Parts |
| $Al_2O_3$ (hardening accelerator) | 2 Parts |
| Inorganic pigment (cadmium yellow) | 15 Parts |

The above composition was stirred with 300 parts of water in a high speed agitator, and then was filtered to be freed of the solid component of large particle sizes exceeding 325 mesh.

Then the above sheet-formed base material was put in a frame of 910 × 1,820 × 6 mm in size, and onto which the surface material was coated with a sprayer to a thickness of 0.5 – 1.0 mm. The coated surface was contacted with a lustrous stainless steel sheet and pressed under a pressure of 200 kg/cm².

Thus shaped sheet structure was subjected to the primary aging in 80° – 90°C. steam for 10 hours, and further to the secondary aging in an autoclave at 180°C. and 8 atmospheres, for 10 hours, to become completely hardened whereupon the base and surface materials were strongly integrated.

The article was thoroughly dried and subjected to the physical property tests, with excellent results as below:

| | |
|---|---|
| Surface hardness: | 35 – 40 |
| Pencil hardness: | >9H |
| Weather-proof property: | Excellent |
| Peeling: | 0% |
| Non-combustibility: | Excellent |

EXAMPLES 2 – 4

Example 1 was repeated except that the compositions for base material and surface material were varied as shown in Table 1 below. Thus the non-combustible shaped articles having the properties also as shown in Table 1 were obtained.

Table 1

| Composition | Example No. 1 | | Example No. 2 | | Example No. 3 | |
|---|---|---|---|---|---|---|
| Base material | | | | | | |
| Silex⁽ᵃ⁾ | 100 | parts | 100 | parts | 100 | parts |
| Slaked lime⁽ᵇ⁾ | 100 | " | 100 | " | 100 | " |
| $CaO/SiO_2$ mol ratio | 0.8 | | 0.8 | | 0.8 | |
| $Al_2O_3$ (hardening accelerator) | 0.4 | part | 2 | parts | 2 | parts |
| Asbestos fiber (5 mm) | 110 | " | 100 | " | 100 | " |
| Water | 8680 | " | 2416 | " | 2416 | " |
| Surface material | | | | | | |
| Silex⁽ᵃ⁾ | 100 | " | 100 | " | — | |
| Diatomaceous earth⁽ᶜ⁾ | — | | — | | 100 | " |
| Slaked lime⁽ᵇ⁾ | 200 | " | 100 | " | 100 | " |
| $CaO/SiO_2$ mol ratio | 1.6 | | 0.8 | | 1.2 | |
| $Al_2O_3$ (hardening accelerator) | 2 | " | 2 | " | — | |
| Inorganic pigment | | | | | | |
| cadmium yellow | 3 | " | 2 | " | — | |
| red iron oxide | — | | — | | 5 | " |
| Water | 300 | " | 200 | " | 200 | " |
| Property test results | | | | | | |
| Surface hardness | 35 – 40 | | 63 – 72 | | 55 – 60 | |
| Pencil hardness | >9H | | >9H | | 5H | |
| Weather-proof property (1,000 hours' exposure) | Excellent | | Excellent | | Excellent | |
| Peeling | 0% | | 0% | | 0% | |
| Non-combustibility | Excellent | | Excellent | | Excellent | |

⁽ᵃ⁾ Chemical composition of silex:
$SiO_2$ 99.4%, $Al_2O_3$ 0.44%, $Fe_2O_3$ 0.04% ignition loss: 0.22%
⁽ᵇ⁾ Purity of slaked lime: 98%
⁽ᶜ⁾ Chemical composition of diatomaceous earth:
$SiO_2$ 78.56%, $Al_2O_3$ 13.21%, $Fe_2O_3$ 4.11%

Table 1-continued

| Composition | Example No. 1 | Example No. 2 | Example No. 3 |
|---|---|---|---|
| CaO 1.51%, MgO 1.25%, $H_2O$ 2-3% ignition loss: 1.11% | | | |

EXAMPLE 5

Base material

| | |
|---|---|
| Silex (chemical composition: $SiO_2$ 99.4%, $Al_2O_3$ 0.44%, $Fe_2O_3$ 0.04% ignition loss: 0.22%) | 33 Parts |
| Slaked lime (purity: 98%) ($CaO/SiO_2$ mol ratio = 0.7) | 47 Parts |
| $Al_2O_3$ | 1 Parts |
| Asbestos fiber (5 mm) | 50 Parts |

The above composition was thoroughly kneaded with 1,200 parts of water in a mixer, and then either passed through a filtering machine to be freed of excess water, or shaped into a sheet by a wet machine.

Surface material

| | |
|---|---|
| Silex (chemical composition: $SiO_2$ 99.4%, $Al_2O_3$ 0.44%, $Fe_2O_3$ 0.04% ignition loss: 0.22%) | 50 Parts |
| Slaked lime (purity: 98%) ($CaO/SiO_2$ mol ratio = 0.8) | 50 Parts |
| Water glass ($SiO_2/Na_2O$ mol ratio = 3.2) | 1 Parts |
| $Al_2O_3$ (hardening accelerator) | 1 Parts |

The above composition was homogeneously dispersed in 100 parts of water, stirred with a high speed agitator, and then filtered to be freed of the solid component of large particle sizes exceeding 325 mesh.

The aforementioned sheet-formed base material was fitted into a frame of 910 × 1,820 × 6 mm in size, and onto which the surface material was coated with a sprayer, to a thickness of 0.5 - 1.0 mm. On the coated surface then a lustrous stainless steel sheet was placed and through this the structure was shaped under a pressure of 200 kg/cm².

Thus formed sheet was subjected to the primary aging in 80° - 90°C. steam for 10 hours, and then to secondary aging in an autoclave of 180°C., under a pressure of 8 atmospheres, for 10 hours, to be completely hardened; thus the base and surface materials were integrated. The obtained shaped article was fully dried and subjected to the physical property tests with the results as given below:

| | |
|---|---|
| Surface hardness: | 63 - 72 |
| Pencil hardness: | >9H |
| Weather-proof property: (1,000 hours' exposure) | Excellent |
| Peeling: | 0% |
| Non-combustibility | Excellent |
| Boiling test (5 days): | No change |
| Water-absorption: (time required to absorb 1 cc of water) | 8 hours |

The above experiment was repeated except that the amount of water glass added to the surface material was varied in each run, as 3, 5, 10, and 20 parts. The results of measuring the water-absorbing property of the products in the similar manner were, respectively, 10 hours when 3 parts of water glass was used, and 20 hours in all of the other runs. Thus the water-absorption decreased with the increase in water glass content of the product, other properties remaining substantially the same.

The above experiment of Example 5 was repeated except that the water glass component added to the surface material was replaced by the water-soluble silicate identified in the table below. The water absorptions of the resulting products were as given also in the same table, while the other physical properties were substantially the same as those obtained in Example 6.

| Type | Amount Added (part) | Water Absorption (time required for absorption of 1 cc of water; hrs.) | | | | |
|---|---|---|---|---|---|---|
| | | 0 | 3 | 5 | 10 | 20 |
| Tetrasodium monosilicate $2Na_2O.SiO_2.\times H_2O$ | | 0.5 | 12 | 12 | 16 | 14 |
| Hexasodium disilicate $3Na_2O_2.SiO_2.\times H_2O$ | | 0.5 | 12 | 12 | 16 | 14 |
| Disodium monosilicate $Na_2O.SiO_2.\times H_2O$ | | 0.5 | 11 | 11 | 14 | 14 |

EXAMPLE 6

Base material

| | |
|---|---|
| Silex (chemical composition: $SiO_2$ 99.4%, $Al_2O_3$ 0.44%, $Fe_2O_3$ 0.04% ignition loss: 0.22%) | 50 Parts |
| Slaked lime (purity: 98%) ($CaO/SiO_2$ mol ratio = 0.8) | 50 Parts |
| $Al_2O_3$ (hardening accelerator) | 1 Parts |
| Asbestos | 50 Parts |

Surface material

| | |
|---|---|
| Silex (chemical composition: $SiO_2$ 99.4%, $Al_2O_3$ 0.44%, $Fe_2O_3$ 0.04% ignition loss: 0.22%) | 50 Parts |
| Slaked lime (purity: 98%) $CaO/SiO_2$ mol ratio = 0.8) | 50 Parts |
| $Al_2O_3$ (hardening accelerator) | 1 Parts |
| Asbestos | 50 Parts |

Surface material

| | |
|---|---|
| Silex (chemical composition: $SiO_2$ 99.4%, $Al_2O_3$ 0.44%, $Fe_2O_3$ 0.04% ignition loss: 0.22%) | 50 Parts |
| Slaked lime (purity: 98%) ($CaO/SiO_2$ mol ratio = 0.8) | 50 Parts |
| $Al_2O_3$ (hardening accelerator) | 2 Parts |
| Potassium-water glass | 1-20 Parts |

The base material and surface material of the above compositions were treated similarly as in Example 5, to produce the non-combustible shaped article exhibiting the following physical properties. As the potassium-water glass in the composition for surface material, that having the $SiO_2/K_2O$ mol ratio ranging from 3 to 3.15 (A) and that with the same mol ratio ranging from 3.4 to 3.7 (B) were used each in the specified quantities. All the products showed substantially the same properties, regardless of difference in such water glass type and content, except somewhat varying water-absorptions as shown in the table below:

Physical properties:
- Surface hardness: 63 – 72
- Pencil hardness: 9H
- Weather-proof property: Excellent
- Peeling: 0%

The water-absorption (time (hrs.) required for the article to absorb 1 cc of water) were as follows:

| Type of Potassium-Water Glass | Amount of Potassium-Water Glass 1 | 3 | 5 | 10 | 20 |
|---|---|---|---|---|---|
| A | 10 | 13 | 14 | 20 | 15 |
| B | 10 | 13 | 14 | 20 | 15 |

If no water glass was used, the product's water absorption time measured in the same manner was 0.5 hour.

EXAMPLES 7 – 11

Example 5 was repeated except that the compositions of the base and surface materials were varied in each run as in Table 2 below, with the results also given in the same table. The silex and slaked lime employed were identical with those employed in Example 5.

$ZrO.SiO_2.CaO.H_2O$ (Examples 7 and 8) or $M_2O.SiO_2.CaO.H_2O$ (M standing for Na in Example 9, K in Example 10, and Li in Example 11), and were strongly integrated.

EXAMPLE 12

Base material

Silex (chemical composition:
  $SiO_2$ 99.4%, $Al_2O_3$ 0.44%, $Fe_2O_3$ 0.04%
  ignition loss: 0.22%) — 53 Parts
Slaked lime (purity: 98%) — 47 Parts
  ($CaO/SiO_2$ mol ratio = 0.7)
$Al_2O_3$ (hardening accelerator) — 1 Parts
Asbestos — 50 Parts The above composition was thoroughly kneaded with 1,200 parts of water in a mixer, and thereafter either passed through a filtering machine to be freed of the excessive water, or shaped into a sheet with a wet machine.

Surface material

Silex (chemical composition:
  $SiO_2$ 99.4%, $Al_2O_3$ 0.44%, $Fe_2O_3$ 0.04%
  ignition loss: 0.22%) — 50 Parts
Slaked lime (purity: 98%) — 50 Parts
Polyvinyl acetate
  (molecular weight: 20,000) — 3 Parts
$Al_2O_3$ (hardening accelerator) — 1 Part Table 2

| Composition | Example No. 7 | | Example No. 8 | | Example No. 9 | | Example No. 10 | | Example No. 11 | |
|---|---|---|---|---|---|---|---|---|---|---|
| Base Material | | | | | | | | | | |
| Silex | 53 | parts | 53 | parts | 53 | parts | 53 | parts | 53 | parts |
| Slaked lime | 47 | " | 47 | " | 47 | " | 47 | " | 47 | " |
| CaO/SiO₂ mol ratio | 0.7 | | 0.7 | | 0.7 | | 0.7 | | 0.7 | |
| Al₂O₃ (hardening accelerator) | 1 | parts | 1 | part | 1 | part | 1 | part | 1 | part |
| Asbestos | 50 | parts | 50 | parts | 50 | parts | 50 | parts | 50 | parts |
| Water | 1200 | " | 1200 | " | 1200 | " | 1200 | " | 1200 | " |
| Surface material | | | | | | | | | | |
| Silex | 50 | " | 50 | " | 50 | " | 50 | " | 50 | " |
| Slaked lime | 50 | " | 50 | " | 50 | " | 50 | " | 50 | " |
| CaO/SiO₂ mol ratio | 0.8 | | 0.8 | | 0.8 | | 0.8 | | 0.8 | |
| Al₂O₃ (hardening accelerator) | 1 | part | 1 | part | 1 | part | 1 | part | 1 | part |
| Zirconium oxide | 3 | parts | — | | — | | — | | — | |
| Zirconium silicate | — | | 3 | parts | — | | — | | — | |
| Sodium hydroxide | — | | — | | 3 | parts | — | | — | |
| Potassium hydroxide | — | | — | | — | | 3 | parts | — | |
| Lithium hydroxide | — | | — | | — | | — | | 3 | parts |
| Inorganic pigment cadmium yellow | — | | — | | — | | 5 | parts | — | |
| red iron oxide | — | | — | | — | | — | | 5 | parts |
| Water | 100 | parts | 200 | parts | 100 | parts | 200 | parts | 200 | parts |
| Test results | | | | | | | | | | |
| Surface hardness | 63 – 72 | | 60 – 70 | | 63 – 72 | | 63 – 72 | | 63 – 72 | |
| Pencil hardness | >9H | | >9H | | >9H | | >9H | | >9H | |
| Weather-proof property (1,500 hours' exposure) | Excellent | | Good | | Excellent | | Good | | Excellent | |
| Peeling | 0% | | 0% | | 0% | | 0% | | 0% | |
| Abrasion resistance | 25 mg | | 8 mg | | 17 mg | | 17 mg | | 10 mg | |
| Water absorption[*] | 10% | | 8% | | 12% | | 12% | | 12% | |
| Non-combustibility | Excellent | | Excellent | | Excellent | | Excellent | | Excellent | |
| Heat resistance | Stable up to 600°C. | | Stable up to 600°C. | | Stable up to 600°C. | | Stable up to 600°C. | | Stable up to 600°C. | |
| Boiling test (4 hours' boiling) | No change | | No change in surface condition | | No change in surface condition | | No change in surface condition | | No change in surface condition | |
| Alkali resistance | No change | | " | | " | | " | | No change | |

[*] The water absorption was determined by the percentile weight increase of the sample after 48 hours' immersion in water.

The shaped articles obtained in the above Examples were thoroughly dried and subjected to X-ray diffraction and differential thermal analysis. Whereby it was confirmed that the surface and base materials formed fine crystals of the compound of the composition, The above composition was dispersed in 100 parts of water, stirred with a high speed agitator, and filtered to be freed of the solid component of large particle sizes exceeding 325 mesh.

The sheet-formed base material was fitted into a frame of 910 × 1,820 × 6 mm in size, and onto which the aqueous dispersion of above surface material was coated with a sprayer, to a thickness of 0.5 to 1.0 mm. On the coated surface a lustrous stainless steel sheet was flatly mounted, and through this the structure was shaped under a pressure of 200 kg/cm$^2$.

Then the structure was subjected to the primary aging in 80° – 90°C. steam for 10 hours, and further to the secondary aging in an autoclave at 180°C. and 8 atmospheres, for 10 hours, to be completely hardened, and the surface and base materials were integrated.

Thus obtained shaped article was thoroughly dried and subjected to physical property tests, with excellent results as below:

| | |
|---|---|
| Surface hardness: | 63 – 62 |
| Pencil hardness: | >9H |
| (1,000 hours' exposure): | Excellent |
| Peeling: | 0% |
| Non-combustibility: | Excellent |
| Boiling test (5 days): | No change in surface conditions |
| Water absorption: (time required for absorption of 1 cc of water) | 20.5 hours |

EXAMPLES 13 – 15

Example 12 was repeated except that the composition of surface material was varied in each run as shown in Table 3 below. The results were as given in the same table. The compositions of silex and slaked lime employed were identical with those of Example 12.

| | |
|---|---|
| Silex (chemical composition: $SiO_2$ 99.4%, $Al_2O_3$ 0.44%, $Fe_2O_3$ 0.04% ignition loss: 0.22%) | 55 Parts |
| Slaked lime (purity: 98%) ($CaO/SiO_2$ mol ratio = 0.75) | 45 Parts |
| $Al_2O_3$ (reaction promotor) | 1 Parts |
| Asbestos fiber (5 mm) | 50 Parts |

The above composition was added with 300 parts of water, and thoroughly kneaded in a mixer. Thereafter the composition was either passed through a filtering machine to be freed of excessive water, or shaped into a sheet with a wet machine.

Surface material

| | |
|---|---|
| Silex (chemical composition: $SiO_2$ 99.4%, $Al_2O_3$ 0.44%, $Fe_2O_3$ 0.04% ignition loss: 0.22%) | 50 Parts |
| Slaked lime (purity: 98%) ($CaO/SiO_2$ mol ratio = 0.8) | 50 Parts |
| $Al_2O_3$ (hardening accelerator) | 1 Parts |

The above composition was stirred with 100 parts of water in a high speed agitator, and filtered to be freed of solid component of large particle sizes exceeding 325 mesh, to form a dispersion.

The sheet-formed base material was fitted into a frame of 910 × 1,820 × 6 mm in size, and onto which the above dispersion was coated with a sprayer, to a thickness of 0.5 to 1.0 mm. On the thus coated surface a lustrous stainless steel sheet was flatly mounted, and through this the structure was shaped under a pressure of 200 kg/cm$^2$.

Table 3

| Composition | Example No. 13 | Example No. 14 | Example No. 15 | Example No. 16 |
|---|---|---|---|---|
| Surface material | | | | |
| Silex | 50 Parts | 50 Parts | 50 Parts | 50 Parts |
| Slaked lime | 50 Parts | 50 Parts | 50 Parts | 50 Parts |
| CaO/SiO$_2$ mol ratio | 0.8 | 0.8 | 0.8 | 0.8 |
| Al$_2$O$_3$ (hardening accelerator) | 1 part | 1 part | — | — |
| Resinous additive | | | | |
| Butyl acrylate polymer (molecular weight:20,000) | — | 3 parts | — | — |
| Maleic acid-glycol ester polymer (molecular weight:300,000) | — | — | 3 parts | — |
| Rubbery styrene/butadiene copolymer (molecular weight:200,000) | — | — | — | 3 parts |
| Inorganic pigment | | | | |
| Cadmium yellow | 5 parts | 5 parts | — | — |
| Red iron oxide | — | — | 5 parts | — |
| Water | 200 parts | 200 parts | 200 parts | 200 parts |
| Test results | | | | |
| Surface hardness | 63 – 72 | 60 – 70 | 60 – 70 | 63 – 72 |
| Pencil hardness | >9H | >9H | 6H | >9H |
| Weather-proof property (1,000 hours' exposure) | No change | No change | No change | No change |
| Peeling | 0% | 0% | 0% | 0% |
| Non-combustibility | Excellent | Excellent | Excellent | Excellent |
| Boiling test (4 hours) | No change in surface condition | No change in surface condition | Excellent | Excellent |
| Water absorption (time required for absorption of 1 cc of water) | 5 hours and 17 minutes | 40 hrs. | 30 hrs. | 28.5 hrs. |
| Heat resistance | Stable up to 600°C. | Stable up to 600°C. | Stable up to 600°C. | Stable up to 600°C. |
| Alkali resistance | No change | No change in surface condition | No change | No change |

EXAMPLE 17

Base material

Thus formed sheet was subjected to the primary aging in 80° – 90°C. steam for 10 hours, and further to the secondary aging in an autoclave at 180°C. and 8 atmospheres, for 10 hours, to be hardened and integrated.

On said coated surface further an acrylic paint ("Vinylose" product of Dainippon Paint K.K.) was applied, and dried to provide a non-combustible shaped article of beautiful appearance.

The results of physical property tests of the above shaped article were as follows:

| | |
|---|---|
| Surface hardness: | 30 |
| Pencil hardness: | >9H |
| Boiling test (4 hrs.): | Excellent |
| Weather-proof property: (1,500 hrs' exposure) | No change |
| Heat resistance: | Stable at 200°C. |
| Water-permeability: | Low |
| Surface condition: | Smooth |

EXAMPLE 18

On one of the surfaces of the base material of identical composition with that employed in Example 17, the dispersion of surface material of the identical composition with that of Example 17 was coated, and hardened under the heating in identical conditions as of Example 17, to be integrated. Further onto the surface material, a water glass type paint (tradename: "Potassium-Water Glass," product of Nippon Kagaku Kogyo K.K.) was applied and dried, to provide a noncombustible shaped article with painted surface. The results of physical property tests of this article were as follows:

| | |
|---|---|
| Surface hardness: | 30 - 35 |
| Pencil hardness: | >9H |
| Boiling test (4 hrs.): | No change in surface condition |
| Weather-proof property (2,000 hrs' exposure): | No change |
| Peeling: | 0%, of the paint layer |
| Surface condition: | Smooth |

EXAMPLE 19

The base material and surface material of respectively identical compositions with those employed in Example 17 were integrally hardened under identical conditions, and onto the coated surface thereof a styrene/acrylonitrile paint (tradename: "V-top", product of Dainippon Paint K.K.) was applied. The structure was then dried to provide a non-combustible shaped article with a paint layer formed on one of its surfaces.

The results of the physical property tests of the shaped article were as follows:

| | |
|---|---|
| Surface hardness: | 25 |
| Pencil hardness: | >9H |
| Boiling test:(4 hrs.): | No change in surface condition |
| Weather-proof property (450 hrs' exposure): | No change |
| Peeling: | 0%, of the paint layer |
| Water-permeability: | Low |
| Surface condition: | Smooth |

EXAMPLE 20

A hardened, integrated shaped structure was formed in the identical manner from identical surface and base materials with those of Example 17. On the surface of the coating layer of the structure, further a vinyl acetate type paint (tradename: "Vinypaint", product of Kansai Paint Co.) was applied and dried, to provide a non-combustible shaped article with a paint layer formed on its surface.

The results of physical property tests of thus obtained article were as follows:

| | |
|---|---|
| Surface hardness: | 20 |
| Pencil hardness: | >9H |
| Weather-proof property (150 hrs' exposure): | No change |
| Heat resistance: | Stable at 150°C. |
| Water-permeability: | Low |
| Surface condition: | Smooth |

EXAMPLES 21 – 27

Example 1 was repeated except that the compositions specified in Table 4 below were used as the base and surface materials, with the results as shown in the same table. The chemical compositions of silex, slaked lime, and diatomaceous earth were identical with those employed in the foregoing Examples.

Table 4

| Composition | Example No. 21 | Example No. 22 | Example No. 23 | Example No. 24 | Example No. 25 | Example No. 26 | Example No. 27 |
|---|---|---|---|---|---|---|---|
| Base material | | | | | | | |
| Silex | — | — | 50 parts | 50 parts | 50 parts | 50 parts | 50 parts |
| Fly ash | 65 parts | 65 parts | — | — | — | — | — |
| Slaked lime | 35 parts | — | 50 parts | 50 parts | 50 parts | 50 parts | 50 parts |
| Cement | — | 35 parts | — | — | — | — | — |
| CaO/SiO₂ mol ratio | 0.7 | 0.7 | 0.8 | 0.8 | 0.8 | 0.8 | 0.8 |
| Asbestos (5 mm) | 50 parts | 50 parts | 50 parts | 50 parts | 20 parts | 10 parts | 10 parts |
| Rock wool | — | — | — | — | 30 parts | 50 parts | — |
| Polypropylene fiber (3 de. 10 mm) | — | — | 2 | 4 | — | — | — |
| Slag wool | — | — | — | — | — | — | 50 parts |
| Water | 2500 parts | 2500 parts | 2500 parts | 2500 parts | 2500 parts | 2500 parts | 2500 parts |
| Surface material | | | | | | | |
| Silex | 100 parts | — | 100 parts | 100 parts | 100 parts | 100 parts | 100 parts |
| Diatomaceous earth | — | 100 parts | — | — | — | — | — |
| Slaked lime | 150 parts | 150 parts | 150 parts | 150 parts | 150 parts | 150 parts | 150 parts |
| CaO/SiO₂ mol ratio | 1.5 | 1.5 | 1.5 | 1.5 | 1.5 | 1.5 | 1.5 |
| Inorganic pigment (cadmium yellow) | 10 parts | 10 parts | 10 parts | 10 parts | 10 parts | 10 parts | 10 parts |
| Water | 250 parts | 250 parts | 250 parts | 250 parts | 250 parts | 250 parts | 250 parts |
| Test results | | | | | | | |
| Surface hardness | 60 – 70 | 30 – 40 | 45 – 50 | 43 – 46 | 55 – 60 | 45 – 50 | 30 – 40 |
| Pencil hardness | >9H | >9H | >9H | >9H | >9H | >9H | >9H |
| Weather-proof property (1,000 hrs' exposure | Excellent | Excellent | Excellent | Excellent | Excellent | Excellent | Excellent |
| Peeling (%) | 5 | 10 | 0 | 0 | 0 | 6 – 8 | 8 – 10 |
| Water resistance | No change | No change | No change | No change | No change | No change | No change |

Table 4-continued

| Composition | Example No. 21 | Example No. 22 | Example No. 23 | Example No. 24 | Example No. 25 | Example No. 26 | Example No. 27 |
|---|---|---|---|---|---|---|---|
| Non-combustibility | Excellent | Excellent | Excellent | Excellent | Excellent | Excellent | Excellent |

We claim:
1. A non-combustible shaped article composed of
   1. a hydraulic inorganic base material shaped from an inorganic composition consisting essentially of (a) a water-insoluble inorganic substance composed predominantly of silica selected from the group consisting of silex, siliceous sand, aplite, pottery stone, silicate terra abla, paigeite, diatomaceous earth, perlite and fly ash, and (b) an inorganic substance composed predominantly of calcium oxide selected from the group consisting of, slaked lime, quick lime, calcium carbonate and gypsum, components (a) and (b) being present in such amounts that the mol ratio of calcium oxide to silica is in the range of 0.5 to 2.0, and (c) mineral fibers present in an amount of 10–200 parts by weight per 100 parts by weight of the total amount of components (a) and (b), and (d) water; and
   2. a surface material integrally bound to at least one surface of said base material, which is applied to said surface as an aqueous dispersion of a hydraulic inorganic composition consisting essentially of a water-insoluble inorganic mixture composed of (e) a water-insoluble inorganic substance composed predominantly of silica selected from the group consisting of silex, siliceous sand, aplite, pottery stone, silicate terra abla, paigeite, diatomaceous earth, perlite and fly ash and (f) an inorganic substance composed predominantly of calcium oxide selected from the group consisting of, slaked lime, quick lime, calcium carbonate and gypsum, components (e) and (f) being present in such amounts that the mol ratio of calcium oxide to silica is in the range of 0.8 to 4.0 with at least one member selected from the group consisting of a water-soluble silicate compound, a zirconium compound and an alkali metal hydroxide;
   said non-combustible shaped article being hardened under heating at a temperature not lower than 50°C to form an integral structure, the latter temperature being the lowest temperature at which the shaped article can be hardened.

2. The non-combustible shaped article of claim 1, in which the mineral fibers are selected from the group consisting of chrysotile asbestos, amosite asbestos, crocidolite asbestos, amphibole asbestos, tremolite asbestos, actinolite asbestos, rock wool, glass fiber, and slag wool.

3. The non-combustible shaped article of claim 1, in which the base material further comprises organic fibers.

4. The non-combustible shaped article of claim 3, in which the organic fibers are present in the amount of at most 20 parts by weight per 100 parts by weight of the hydraulic inorganic composition for the base material.

5. The non-combustible shaped article of claim 3, in which the organic fibers are selected from polypropylene fibers, polyethylene fibers, polyvinyl alcohol fibers, polyamide fibers, acrylic fibers, polydinitrile fibers, polyester fibers, polyvinyl chloride fibers, polyvinylidene chloride fibers, polynosic fibers, acetate fibers, urea fibers, rayon staple fibers, cotton, silk, flax and animal fibers.

6. The non-combustible shaped article of claim 1, in which the surface material further comprises at most 20 parts by weight of inorganic pigment per 100 parts by weight of the hydraulic inorganic composition composing the surface material.

7. The non-combustible shaped article of claim 6, in which the inorganic pigment is selected from the group consisting of red iron oxide, chrome yellow, prussian blue, ultramarine, iron black, molybdenum red, and zinc chromate.

8. The non-combustible shaped article of claim 1, which further has an organic or inorganic paint layer formed on the surface of the surface material.

9. The non-combustible shaped article of claim 8, in which the organic paint is selected from the group consisting of an acrylic paint, and a vinyl acetate paint.

10. The non-combustible article of claim 8, in which the inorganic paint is a water glass paint.

11. The non-combustible shaped article of claim 1 in which the surface material is composed of a mixture of components (e), (f) and a water-soluble silicate compound selected from the group consisting of sodium orthosilicate, sodium metasilicate, sodium sesquisilicate, sodium disilicate, potassium metasilicate, potassium disilicate, and potassium tetrasilicate.

12. The non-combustible shaped article of claim 1 in which the surface material is composed of a mixture of components (e), (f), and a zirconium compound capable of supplying zirconium oxide under hardening conditions and which is selected from the group consisting of zirconium oxide, zirconium silicate, zirconium carbonate and zirconium hydroxide.

13. A non-combustible shaped article according to claim 1 wherein the inorganic substance composed predominantly of calcium oxide used in both the hydraulic inorganic base material and the surface material is slaked lime.

14. A non-combustible shaped article according to claim 1 wherein the inorganic substance composed predominantly of calcium oxide used in both the hydraulic inorganic base material and the surface material is quick lime.

15. A non-combustible shaped article according to claim 1 wherein the inorganic substance composed predominantly of calcium oxide used in both the hydraulic inorganic base material and the surface material is calcium carbonate.

16. A non-combustible shaped article according to claim 1 wherein the inorganic substance composed predominantly of calcium oxide used in both the hydraulic inorganic base material and the surface material is gypsum.

17. The non-combustible shaped article of claim 1, in which the alkali metal hydroxide is contained therein selected from the group consisting of potassium hydroxide, sodium hydroxide, and lithium hydroxide.

* * * * *